(12) United States Patent
Lam

(10) Patent No.: US 7,137,626 B2
(45) Date of Patent: Nov. 21, 2006

(54) PACKET LOSS RECOVERY

(75) Inventor: Siu H. Lam, WoodCliff Lake, NJ (US)

(73) Assignee: Intel Corporation, Santa Clara, CA (US)

( * ) Notice: Subject to any disclaimer, the term of this patent is extended or adjusted under 35 U.S.C. 154(b) by 1065 days.

(21) Appl. No.: 10/207,466

(22) Filed: Jul. 29, 2002

(65) Prior Publication Data

US 2004/0017811 A1 Jan. 29, 2004

(51) Int. Cl.
*H04J 1/16* (2006.01)
(52) U.S. Cl. ....................... 270/216; 370/242
(58) Field of Classification Search ............ 370/216, 370/241, 242, 252, 253, 474, 233
See application file for complete search history.

(56) References Cited

U.S. PATENT DOCUMENTS 6,584,104 B1 * 6/2003 McGowan ............... 370/394
2003/0058968 A1 * 3/2003 Thomson et al. ......... 375/340

OTHER PUBLICATIONS

Perkins, Hodson, Hardman, A Survey of Packet Loss Recovery Techniques For Streaming Audio, IEEE Network, Sep./Oct. 1998, 40-48, USA.

* cited by examiner

*Primary Examiner*—Brenda Pham
(74) *Attorney, Agent, or Firm*—Buckley, Maschoff & Talwalkar LLC

(57) ABSTRACT

A method, apparatus, and system for recovering from loss of a packet.

29 Claims, 6 Drawing Sheets

PACKET LOSS RECOVERY

BACKGROUND OF THE INVENTION

In packet-based digital communication networks, one or more packets may not be delivered to the intended recipient. Such unreceived packets may be retransmitted upon discovery that they were not delivered. Receipt after transmission or retransmission may, however, be later than desired. Thus, there may be a need for a system, apparatus, and method for recovering from loss or non-timely receipt of a packet.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description wherein like reference numerals are employed to designate like parts or steps, when read with the accompanying drawings in which:

DETAILED DESCRIPTION OF THE INVENTION

Figure 1:
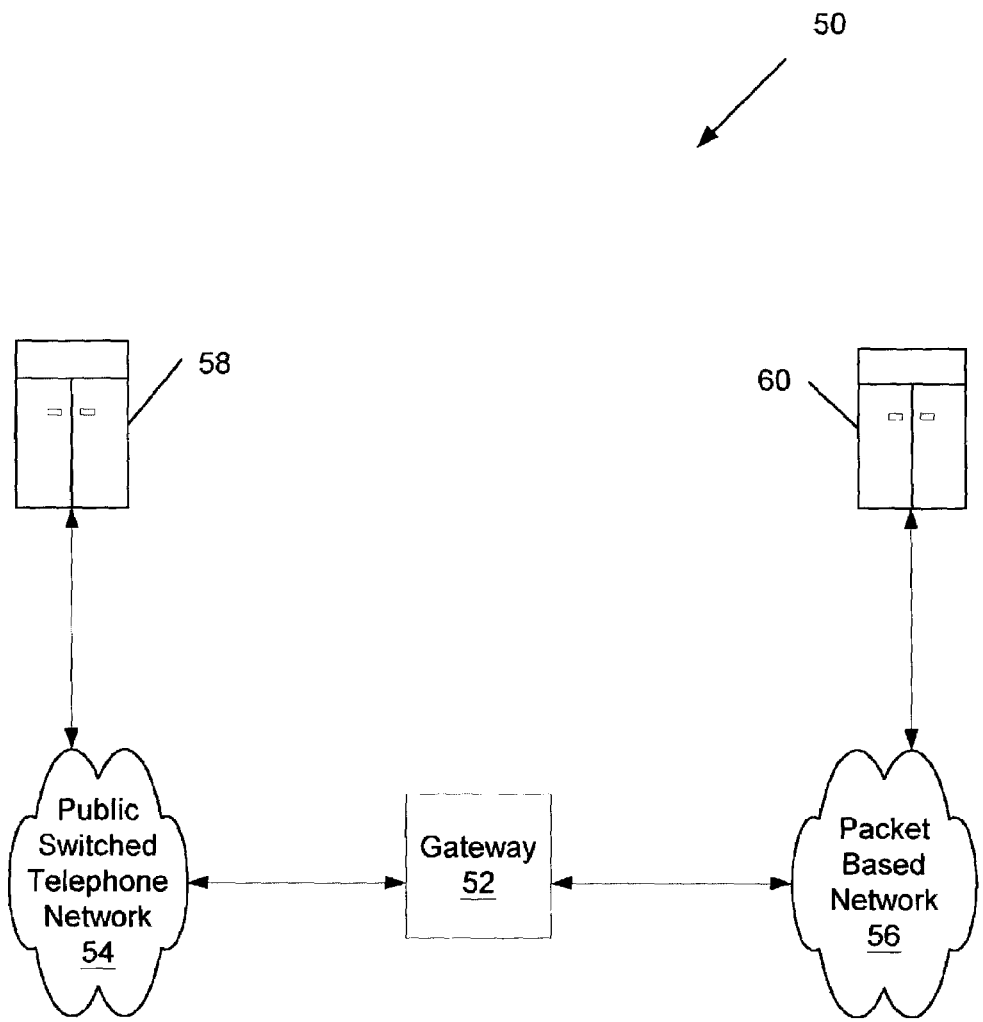
FIG. 1 is a block diagram of a system suitable for practicing an embodiment of the invention.

Reference will now be made in detail to the preferred embodiments of the present invention, examples of which are illustrated in the accompanying drawings. It is to be understood that the Figures and descriptions of embodiments of the present invention included herein illustrate and describe elements that are of particular relevance, while eliminating, for purposes of clarity, other elements found in typical computers and computer networks.

The present packet recovery technique provides solutions to the shortcomings of certain networks, wherein information is passed in packets. Those of ordinary skill in the art will readily appreciate that the packet recovery technique, while described in connection with packets containing voice data, is equally applicable to recovering any packet containing information that may be expressed as an amplitude. For example, the present packet recovery technique may be applied to data including streaming audio or video information. The present packet recovery technique may be applied to multicast systems wherein at least two receiving entities are simultaneously or nearly simultaneously receiving the same information. Other details, features, and advantages of the packet recovery technique will become further apparent in the following detailed description of the embodiments.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification are not necessarily all referring to the same embodiment. References to "or" are furthermore intended as inclusive so "or" may indicate one or the other ored terms or more than one ored term.

The Internet is a network of nodes such as computers, dumb terminals, or other, typically processor-based, devices interconnected by one or more forms of communication media. Typical interconnected devices range from handheld computers and notebook PCs to high-end mainframe and supercomputers. The communication media coupling those devices include twisted pair, co-axial cable, optical fibers and wireless communication methods such as use of radio frequencies.

Network nodes may be equipped with the appropriate hardware, software or firmware necessary to communicate information in accordance with one or more protocols. A protocol may comprise a set of instructions by which the information is communicated over the communications medium. Protocols are, furthermore, often layered over one another to form something called a "protocol stack." In one embodiment of the invention, the network nodes operate in accordance with a packet switching protocol referred to as the User Datagram Protocol (UDP) as defined by the Internet Engineering Task Force (IETF) standard 6, Request For Comment (RFC) 768, adopted in August, 1980 ("UDP Specification"), and the Internet Protocol (IP) as defined by the IETF standard 5, RFC 791 ("IP Specification"), adopted in September, 1981, both available from "www.ietf.org." In another embodiment, Transmission Control Protocol (TCP) as defined by the Internet Engineering Task Force (IETF) standard 7, Request For Comment (RFC) 793, adopted in September, 1981 ("TCP Specification") may be used with IP.

In the present embodiment, "transmitting entities" and "receiving entities" are network nodes that may include a processor or a computer coupled to a network such as, for example, the World Wide Web and that communicates with other processors on the network via, for example, a voice over IP application or a conferencing application (e.g., Microsoft® Netmeeting®) that communicates between applications operating on the node and the UDP/IP protocol stack. UDP is a network communications protocol that offers lesser services than TCP. For example, UDP may provide port numbers to distinguish different user requests and a checksum to verify that data arrived intact. UDP may not provide sequencing of the packets or retransmission of unreceived packets. After the packets are created, the IP layer transmits the packets across a network such as the Internet.

An embodiment of the packet replacement technique is particularly well suited to replacing packets in streaming media. Streaming media is delivered to a user of a receiving entity in, or nearly in, real-time as it is received. Streaming media may be delivered by, for example, playing audio on speakers attached to the receiving entity or playing video on a monitor attached to the receiving entity. Short delays between receipt of a packet and delivery of the information contained in the packet may be caused when, for example, a packet is received before the information in a previous packet has been completely delivered or when a packet is being processed to remove and format the information contained therein. Streaming media, thus, avoids the delay entailed in downloading an entire file and then playing it with a helper application. Streaming generally requires a fast connection and a computer powerful enough to execute the decompression algorithm in real time.

A "packet recovery module" is an application that may be executed on a network node that may include a processor, the processor executing the packet recovery module and being called a packet recovery device. A "session" consists of one or more communications via, for example, serial communication between two or more nodes. A node refers to any processor coupled to the network including transmitting entities, receiving entities, and packet recovery devices.

Nodes may operate as source nodes, destination nodes, intermediate nodes or a combination of those source nodes, destination nodes, or intermediate nodes. Information is passed from source nodes to destination nodes, often through one or more intermediate nodes. Information may comprise any data capable of being represented as a signal, such as an electrical signal, optical signal, acoustical signal and so forth. Examples of information in this context may include data from a voice conversation, videoconference, streaming video, electronic mail ("email") message, voice mail message, graphics, image, video, text and so forth.

A network having a transmitting entity and a receiving entity is contemplated. The transmitting entity is coupled to the network and transmits a plurality of packets containing a data stream capable of being expressed as an amplitude on the network. The receiving entity is also coupled to the network. The receiving entity receives at least two of the plurality of packets transmitted by the transmitting entity. The receiving entity has a processor that contains instructions which, when executed by the processor cause the processor to: (i) ascertain a portion of the data stream contained in each packet, (ii) determine a peak amplitude of a portion of the data stream included in a first received packet, (iii) determine a peak amplitude of a portion of the data stream included in a second received packet, (iv) determine an offset duration from the peak amplitude of the data stream portion included in the first received packet to an end of the data stream portion included in the first received packet, and (v) select a replacement portion of the data stream beginning an amount equal to the offset duration after the peak amplitude of the second received packet and continuing an amount equal to the portion of the data stream contained in each packet.

FIG. 1 illustrates a network 50 having a gateway 52 communicating information between a Public Switched Telephone Network (PSTN) 54 and a packet-based network 56. A transmitting entity 58 is coupled to the PSTN 54 and a receiving entity 60 is coupled to the packet-based network.

The PSTN 54 is a collection of networks operated, for the most part, by telephone companies and administrational organizations. Digital information, such as data transmitted by a computer or facsimile machine, may be transmitted on the PSTN 54. Analog information, such as voice communications transmitted by a telephone, may also be transmitted on the PSTN 54. Such analog information is often converted into a digital signal at, for example, the telephone company. The digitized analog information is typically transmitted using a technique called Time Division Multiplexing (TDM). The digitized analog information may be transmitted, for example, from one telephone company to another telephone company, and then converted back to an analog format prior to delivery to the receiving entity. Information in TDM format may be transmitted over a synchronous network. Thus, all elements of the network carrying the TDM formatted information may be synchronized one with another. In that way, for example, voice data may be received nearly instantly after it is transmitted and a conversation may be conducted such that there is no discernable delay between transmission and reception of the voice communication.

Packet-based networks such as, for example, those using X.25, frame-relay, cell-relay or asynchronous transfer mode (ATM) may not be synchronous. Thus, a transmission sent over a non-synchronous network may be separated into a plurality of packets. Those packets may then be sent across the network, possibly by a variety of routs and, sometimes, with certain packets taking a discernable interval of time to arrive at the receiving entity 60. The receiving entity 60 arranges the packets back into the transmitted information periodically, for example, once all packets are received or each time the next packet of streaming type information is received and then may deliver the transmitted information to a user in the order in which that information is to be reconstructed.

Packets may be delayed in transmission due to, for example, network congestion or failure and retransmission of a packet. Such delay in packet delivery is referred to as "jitter." Minimization of jitter is important in various communications including, for example, transmissions of voice communications, streaming audio, and streaming video. When jitter occurs during transmission of voice communications, the received voice may halt at times when the transmitted voice did not halt, causing the received communication to be broken and unnatural. Thus, for example, when communicating voice communications, streaming audio, or streaming video across a packet-based network, packets that are delayed too long may have to be discarded to meet the timing requirements of the application and eliminate jitter. Such delayed packets, as well as any other packet that is not delivered to a receiving entity or any packet that is delivered to the receiving entity but is desired not to be played for any reason, are referred to herein as "lost packets." Moreover, allowable delays in packet delivery for interactive applications such as, for example, voice communications are short to eliminate any discernable interval of time between transmission of information and receipt of that information.

The transmitting entity 58 may, thus, transmit TDM formatted information across the PSTN 54. That TDM formatted information may be converted to the packet-based format by the gateway 52 and transmitted across the packet-based network 56 to the receiving entity 60. It should be recognized that the transmitting entity 58 could alternately be coupled directly to the packet-based network 56 and send packetized information directly to the receiving entity 60. Moreover, the present packet replacement technique could operate on the packets at the gateway 52 or the receiving entity 60. Furthermore, the receiving entity 60 could also act as a transmitting entity 58 and the transmitting entity 58 could act as a receiving entity 60, for example wherein two-way communication is occurring between those entities 58 and 60.

Figure 2:
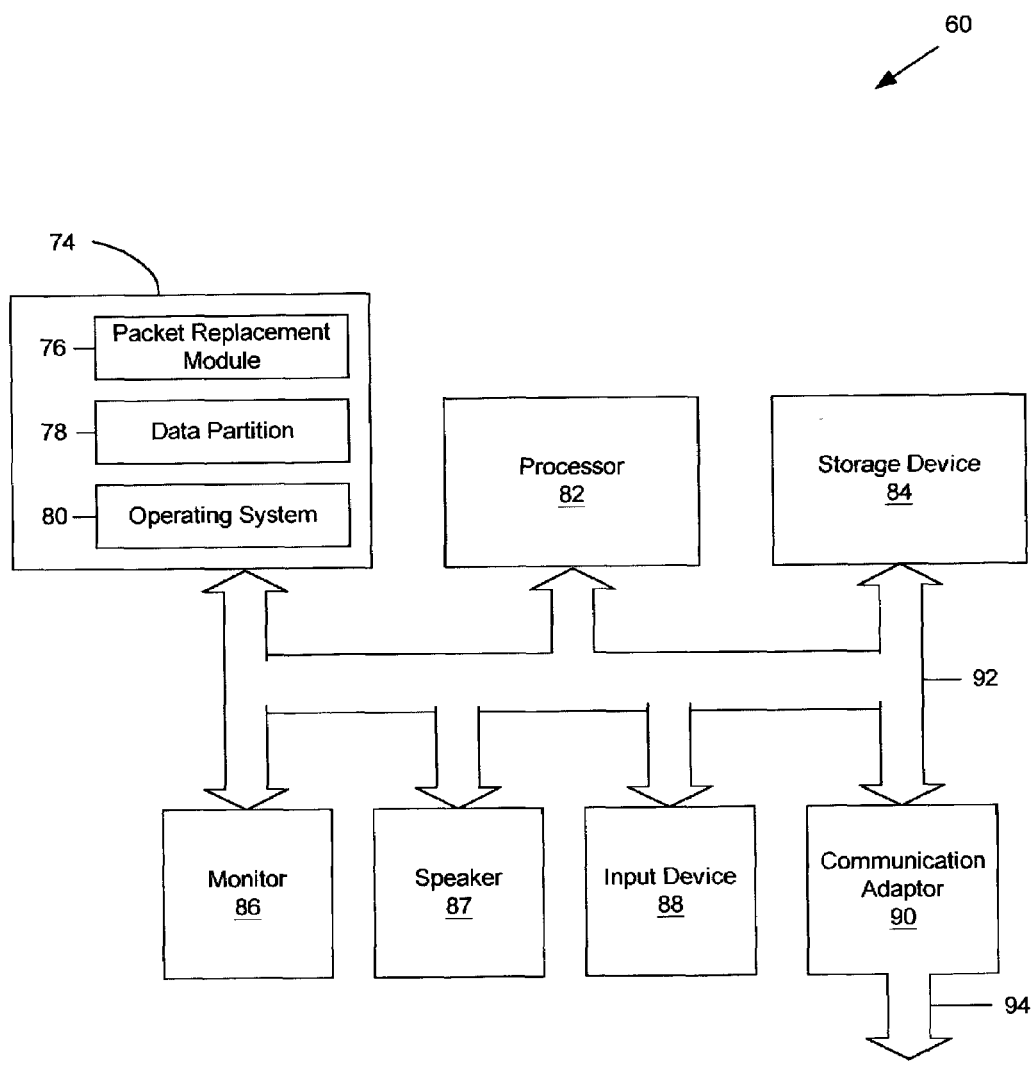
FIG. 2 is a block diagram of a data stream receiving entity suitable for practicing an embodiment of the invention.

Once received, the transmitted information may be resynchronized by the receiving entity 60 and output to, for example, speakers 87 or a monitor 86 as illustrated in FIG. 2.

Thus, there is a need for an apparatus, a system, and a method for recovering from loss of a packet or late packet delivery without waiting for the packet to arrive. A technique for replacing the lost or late packet that requires minimal processing while matching amplitude or, in the case of voice transmission, pitch is therefore disclosed.

A data stream receiving entity is contemplated. The data stream receiving entity has a processor containing instructions which, when executed by the processor cause the processor to: (i) ascertain a portion of the data stream contained in each packet, (ii) determine a peak amplitude of a portion of the data stream included in a first received packet, (iii) determine a peak amplitude of a portion of the data stream included in a second received packet, (iv) determine an offset duration from the peak amplitude of the data stream portion included in the first received packet to an end of the data stream portion included in the first received packet, (v) select a replacement portion of the data stream beginning an amount equal to the offset duration after the peak amplitude of the second received packet and continuing an amount equal to the portion of the data stream contained in each packet, and (vi) deliver the replacement portion in place of the lost packet data.

FIG. 2 illustrates a data stream receiving entity 60 that may replace data from a lost packet. The data stream receiving entity 60 includes memory 74, a processor 82, a storage device 84, a monitor 86, a speaker 87, an input device 88, and a communication adaptor 90. Communication between the processor 82, the storage device 84, the monitor 86, the speaker 87, the input device 88, and the communication adaptor 90 is accomplished by way of a communication bus 92.

The memory 74 may, for example, include random access memory (RAM), dynamic RAM, and/or read only memory (ROM) (e.g., programmable ROM, erasable programmable ROM, or electronically erasable programmable ROM) and may store computer program instructions and information. The memory may furthermore be partitioned into sections in which operating system 80 instructions are stored, a data partition 78 in which data is stored, and a packet replacement module 76 partition in which instructions for carrying out packet replacement functionality are stored. The packet replacement module 76 partition may store program instructions and allow execution by the processor 82 of the program instructions. The data partition 78 may furthermore store data to be used during the execution of the program instructions.

The processor 82 may, for example, be an Intel® Pentium® type processor or another processor manufactured by, for example Motorola®, Compaq®, AMD®, or Sun Microsystems®. The processor 82 may furthermore execute the program instructions and process the data stored in the memory 74. In one embodiment, the instructions are stored in memory 74 in a compressed and/or encrypted format. As used herein the phrase, "executed by a processor" is intended to encompass instructions stored in a compressed and/or encrypted format, as well as instructions that may be compiled or installed by an installer before being executed by the processor.

The storage device 84 may, for example, be a magnetic disk (e.g., floppy disk and hard drive), optical disk (e.g., CD-ROM) or any other device or signal that can store digital information. The communication adaptor 90 permits communication between the data stream receiving entity 60 and other devices or nodes coupled to the communication adaptor 90 at the communication adaptor port 94. The communication adaptor 90 may be a network interface that transfers information from nodes on a network to the data stream receiving entity 60 or from the data stream receiving entity 60 to nodes on the network. The network may be a local or wide area network, such as, for example, the Internet, the World Wide Web, or the network 50 illustrated in FIG. 1. It will be recognized that the data stream receiving entity 60 may alternately or in addition be coupled directly to one or more other devices through one or more input/output adaptors (not shown).

The data stream receiving entity 60 may also be coupled to other output devices such as, for example, a printer (not shown), and various input devices 88 such as, for example, a keyboard or mouse (not shown). It will be recognized, however, that the data stream receiving entity 60 does not necessarily need to have any input device 88 or any output device 86 and 87 to operate. Moreover, the storage device 84 may also not be necessary for operation of the data stream receiving entity 60.

The elements 74, 82, 84, 86, 88, and 90 of the data stream receiving entity 60 may communicate by way of one or more communication busses 92. Those busses 92 may include, for example, a system bus, a peripheral component interface bus, and an industry standard architecture bus.

The receiving entity 60 may alternately be, for example, an IP phone or a residential gateway.

In an embodiment, an article of manufacture is contemplated. The article of manufacture includes a computer readable medium having instructions stored thereon. When the instructions are executed by a processor, the processor: (i) ascertains a portion of a data stream contained in a packet, (ii) determines a peak amplitude of a portion of the data stream included in a first received packet, (iii) determines a peak amplitude of a portion of the data stream included in a second received packet, (iv) determines an offset duration from the peak amplitude of the data stream portion included in the first received packet to an end of the data stream portion included in the first received packet, and (v) selects a replacement portion of the data stream beginning an amount equal to the offset duration after the peak amplitude of the second received packet and continuing an amount equal to the portion of the data stream contained in each packet.

Figure 3:
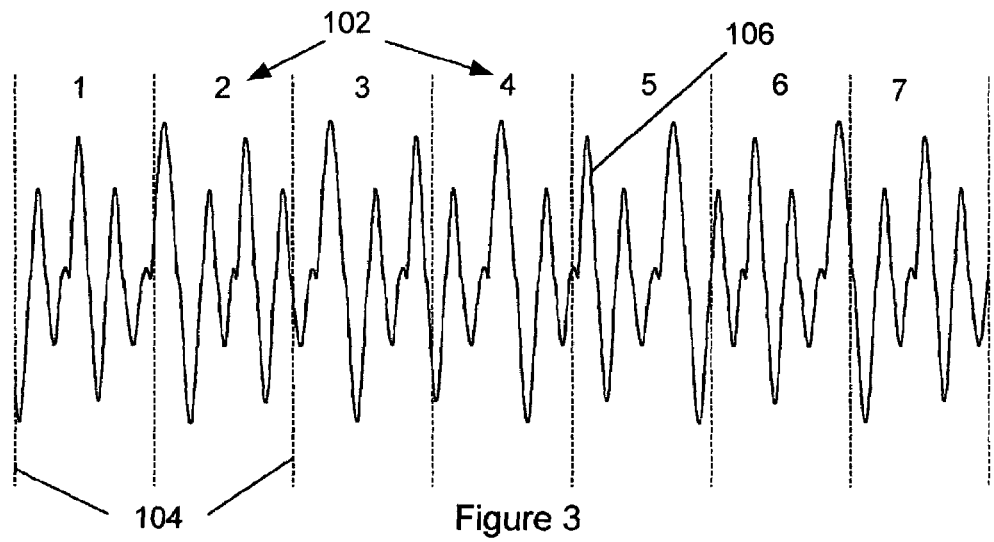
FIG. 3 is a sample data stream signal.

FIG. 3 illustrates a segment of a sample packetized voice signal. Dotted vertical lines 104 indicate separation between packets 102. A voice signal 106 is depicted by a wave having an amplitude. The amplitude of the voice signal 106 corresponds to a pitch of the voice signal 106.

Figure 4:
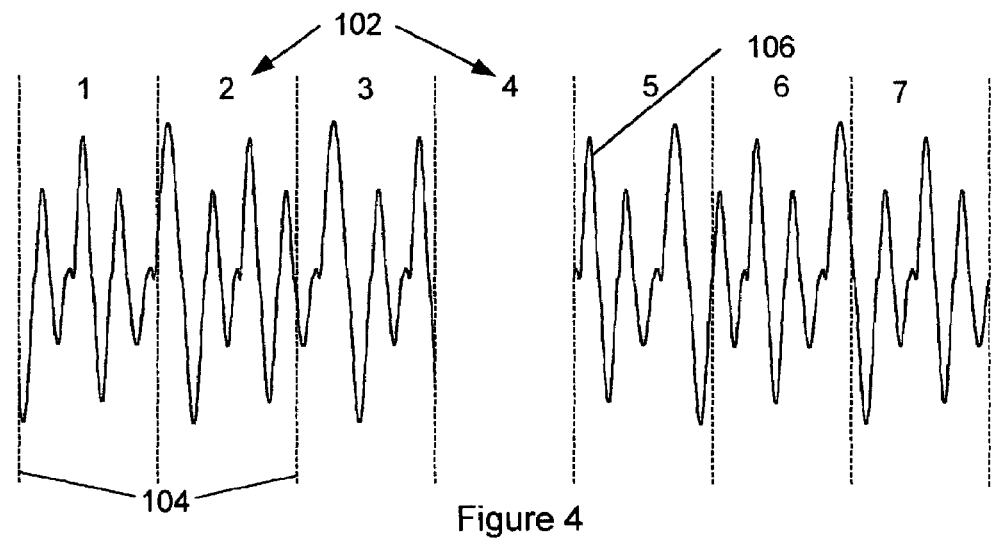
FIG. 4 is the sample data stream signal of FIG. 3, wherein the data stream to be delivered in Packet 4 has not been delivered.

FIG. 4 illustrates the voice signal 106 illustrated in FIG. 3 with Packet 4 102 having not been received by the receiving entity 60. It is desirable for a packet 102 of information such as voice data to be delivered to a user of the receiving entity 60 immediately after the preceding packet is delivered to the user to minimize or eliminate any discernable interval of time between information transmission and receipt of that information. In that way, the received voice data sounds the same as the transmitted voice data.

If the receiving entity 60 does not receive Packet 4 102 by the time the receiving entity 60 is ready to process and deliver the voice data contained in Packet 4 102 to the user, it may be necessary for the receiving entity 60 to eliminate or replace the data that would have been delivered had Packet 4 arrived to prevent a halt in delivery of voice data to the user.

Figure 5:
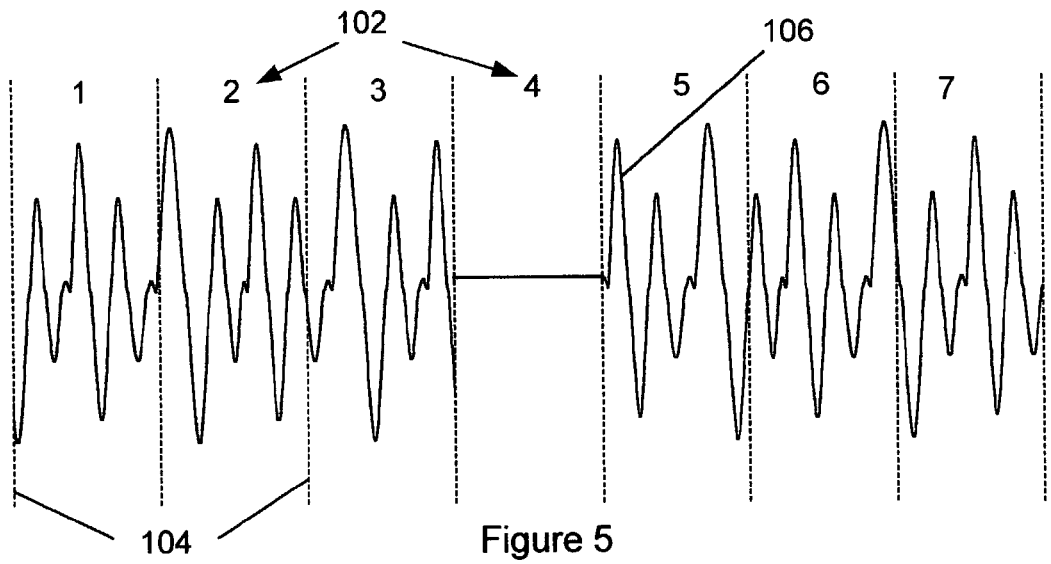
FIG. 5 is the sample data stream signal of FIG. 3, wherein undelivered Packet 4 is replaced by a null data stream.

FIG. 5 illustrates the voice data stream 106 of FIG. 3, wherein the time during which Packet 4 102 is to be transmitted is filled with no data. In that way, Packet 5 102 data may be delivered on schedule after Packet 4 102 data delivery was to be completed to minimize interruption due to loss of Packet 4 102. As illustrated in FIG. 5, the receiving entity 60 may deliver no information when Packet 4 102 information is to be transmitted and then transmit information contained in Packet 5 102 after the information in Packet 4 102 was to be transmitted. Transmission of no voice data may be accomplished by, for example, filling the data stream to be, delivered in place of Packet 4 102 voice data with zeros. Thus, either no sound or a constant pitch sound may be delivered to the user of the receiving entity 60 during the time when Packet 4 voice data was to be delivered and voice data delivery may resume with delivery of Packet 5 voice data at or near the time that Packet 4 voice data delivery was to be completed. Such delivery of no sound or a constant pitch detrimentally interrupts the voice data stream 106 being delivered to the user.

Figure 6:
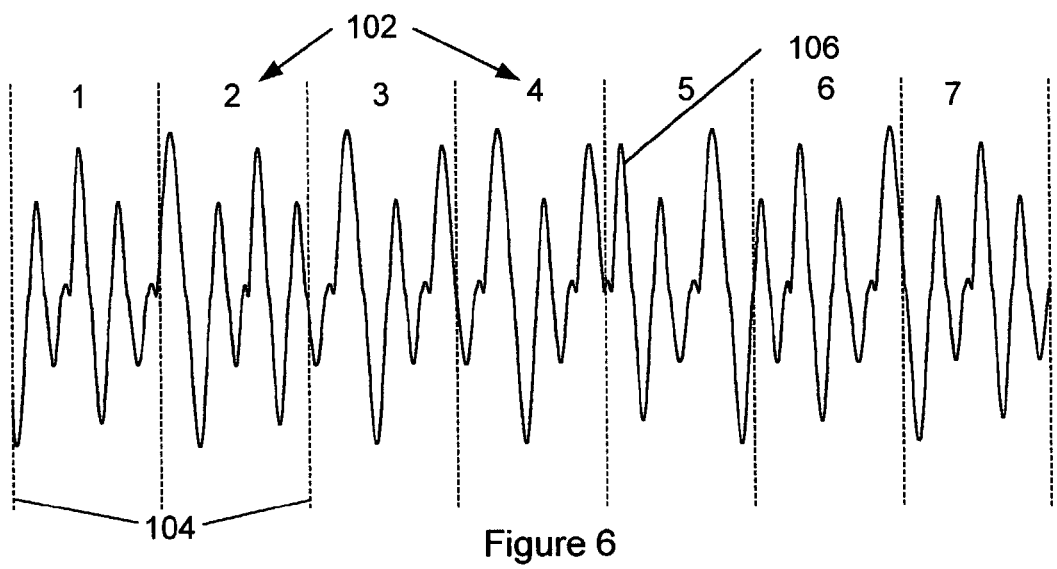
FIG. 6 is the sample data stream signal of FIG. 3, wherein undelivered Packet 4 is replaced by data from Packet 3.

FIG. 6 illustrates the voice data stream 106 of FIG. 3, wherein the data received and delivered in Packet 3 102 has been substituted for the missing Packet 4 data. To accomplish substitution of missing Packet 4 data with Packet 3 data, the receiving entity 60 may repeat delivery of Packet 3 data during the time when the missing Packet 4 data would otherwise have been delivered. That technique, however, produces audible discontinuities and artifacts such as, for example, audible clicks and gurgling sounds.

Figure 7:
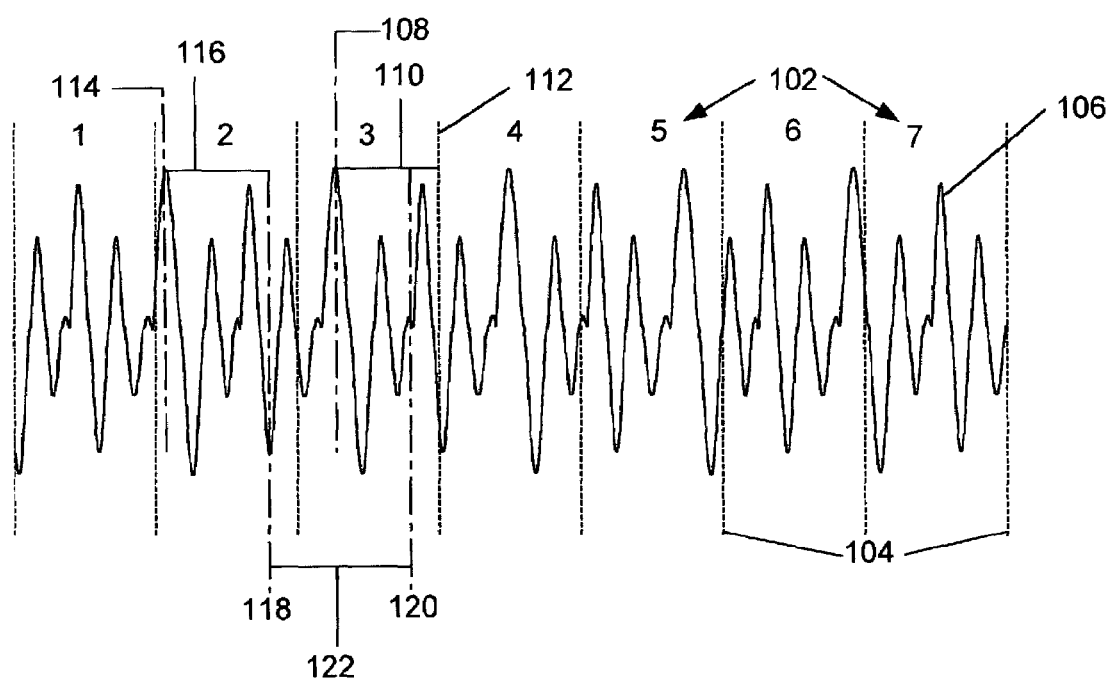
FIG. 7 is the sample data stream signal of FIG. 3, wherein undelivered Packet 4 is replaced by a portion of the data stream.

FIG. 7 illustrates the voice data stream 106 of FIG. 3, wherein missing Packet 4 102 is replaced by a portion of the voice data stream 106 from Packets 2 and 3 102 that is estimated to be pitch synchronous with the voice data of Packets 3 and 5. In that technique, replacement voice data from two or more packets 102 preceding the missing packet are redelivered in place of the missing packet 102. The beginning of the replacement data is selected to be at or near the same pitch as the ending data in the packet 102 preceding the missing packet 102. (In the illustrated example, data having the same pitch lies at the same vertical level on the voice data stream signal 106.) The end of the replacement data is also selected to be at or near the same pitch as the beginning data in the packet 102 following the missing packet 102.

Also illustrated in FIG. 7 are points and durations of interest in selecting replacement data for a missing packet in an embodiment. FIG. 7 may be viewed as a timeline wherein points in time are indicated by vertical dot-dash lines. Durations are indicated by solid horizontal lines. A highest peak in the data contained in Packet 3 102 is indicated at 108. A duration from the highest peak in the data contained in Packet 3 108 to the end of Packet 3 112 is indicated at 110. A highest peak in the data contained in Packet 4 102 is indicated at 114 and a duration from that point 114 that is equal to the duration from the highest peak in the data contained in Packet 3 108 to the end of Packet 3 112 is indicated at 116. A beginning of replacement data for lost Packet 4 102 is indicated at 118, the duration of that replacement data is indicated at 122 and the end of that replacement data is indicated at 120.

A technique that searches data from multiple packets for a beginning pitch that closely matches the ending pitch of the frame prior to the missing frame and an ending pitch that closely matches the beginning pitch of the frame following the missing frame requires significant processing. Such processing requirements are often not practical in commercial systems wherein lowering processing requirements is important. Thus, there is a need for a pitch matching technique that requires minimal processing.

In an embodiment, a lost packet in a data stream is replaced with a received segment of the data stream. In that embodiment, the data stream contains a signal capable of being expressed as an amplitude. In that embodiment, a portion of the data stream contained in each packet is ascertained. A peak amplitude of a portion of the data stream contained within first and second received packets is also determined. An offset duration from the peak amplitude of the data stream portion contained within the first received packet to an end of the data stream portion contained within the first received packet is determined. A portion of the data stream beginning an amount equal to the offset duration after the peak amplitude of the second received packet and continuing an amount equal to the portion of the data stream contained in each packet is then delivered.

In another embodiment, a method of replacing a first frame of a data stream having a plurality of frames is contemplated. The data stream may be capable of being expressed as an amplitude. That method includes: (i) ascertaining a portion of the data stream contained in each frame, (ii) determining a peak amplitude of a portion of the data stream included in a first received frame, (iii) determining an offset duration from the peak amplitude of the data stream portion included in the first received frame to an end of the data stream portion included in the first received frame, (iv) determining a peak amplitude of a portion of the data stream included in a second received frame, (v) and replacing the first frame with a portion of the data stream beginning at the peak amplitude of the data stream included in the second received frame and ending an amount equal to the portion of the data stream contained in each packet.

The data stream may be any data set capable of being expressed graphically as an amplitude. In the example being described in this embodiment, the data stream contains voice data. The data stream may be transmitted across a network such as, for example, the network illustrated in FIG. 1 and may be transmitted in a plurality of packets. Each of those packets may contain a portion of the data stream referred to as a "frame." Those frames of data may be read from the packets, processed into a voice communication, and delivered to the user by the receiving entity 60 in order. Wherein the data stream is voice data, the receiving entity 60 may deliver the data by audibly playing the voice data to a user of the receiving entity 60. Where packets are consistent in size, the frames of data stream contained in those packets are also typically consistent in size.

Figure 8:
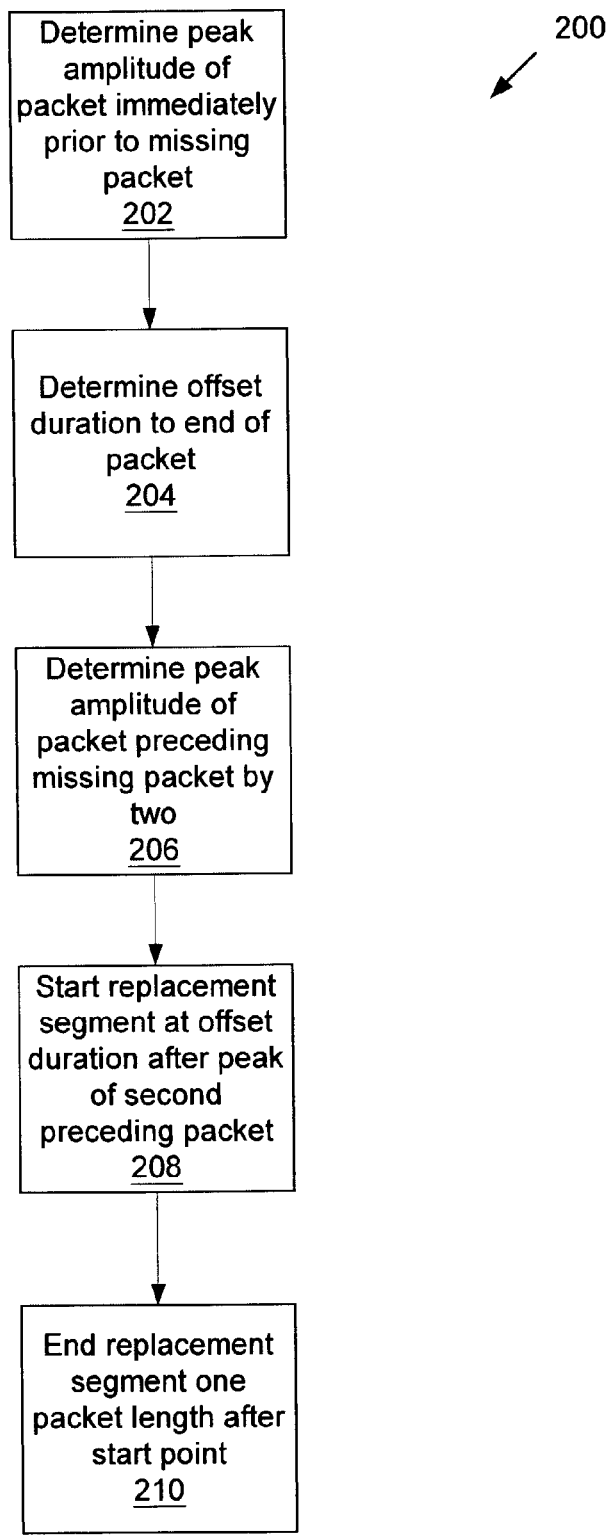
FIG. 8 is a flow diagram illustrating a method of packet replacement in an embodiment.

FIG. 8 illustrates a method of packet replacement flow 200 that requires minimal processing and provides a high quality result, while operating to replace lost Packet 4 of FIG. 7.

It has been found that certain information exhibits short-term self-similarity. Human speech, for example, has been found to follow a pattern that is similar across several packets of such voice data. Therefore, in the packet replacement flow 200 of FIG. 8, a missing packet is replaced with a portion of a data stream from the two packets immediately preceding the missing packet. Moreover, the packet replacement flow 200 of FIG. 8 works well for packets of voice data that are delivered to a user for a time period of 5 ms to 30 ms and may be used for packets of other information and for packets delivered for other lengths of time. Thus, in the present example, each packet contains voice data that would require approximately 40 ms to deliver as a voice communication to a user of a receiving entity.

Each packet in this embodiment contains an equal amount of the data stream and the portion of the data stream contained in each packet is ascertained. In many packet-based network protocols, packets are of a standardized size. Thus ascertaining packet size may be as simple as determining the standard size of a packet in the protocol being used to transmit the data stream.

It should be noted that, although packets and the data contained therein may be of equal size, the duration of time that it would have taken to deliver the information in two packets may not be the same. The duration of time that it takes to deliver the replacement information would, however, typically be approximately the same as the duration of time that it would have taken to deliver the information in the lost packet. Thus the information in the received packet that is to follow the lost packet may be delivered immediately following the replacement information regardless of any difference in the duration of the information in the lost packet and the replacement information.

At 202, the peak amplitude of a portion of the data stream contained within a first received packet is determined. That first received packet, in this example, is Packet 3, which is to be delivered immediately prior to missing Packet 4. In that way, because data streams often maintain relatively constant levels over a short period of time, the data used to create the replacement data to be delivered in place of data from the missing packet is data that is likely to be similar to the missing data. The peak amplitude is indicated at 108 in FIG. 7.

At 204, an offset duration from the peak amplitude of the data stream portion contained within the first received packet to an end of the data stream portion contained within the first received packet is determined. That offset duration 110 extends from the peak amplitude 108 to 112 in FIG. 7.

At 206, the peak amplitude of a portion of the data stream contained within a second received packet is determined. That second received packet may, for example, be a packet that is to be delivered immediately prior to the first received packet. That second received packet is Packet 2 102 in the data stream 106 illustrated in FIG. 7. The peak amplitude of Packet 2 102 is indicated at 114 in FIG. 7.

At 208, a beginning point for the replacement data segment for the missing packet is selected at an amount equal to the offset duration 110 after the peak amplitude 114 of the second received packet. The amount equal to the offset duration is illustrated at 116 in FIG. 7. The beginning point for the replacement data in FIG. 7 is illustrated at 118 in Packet 2 102.

At 210 an ending point for the replacement data segment for the missing packet is selected at an amount equal to the amount of data contained in a packet after the beginning point. In FIG. 7, that ending point is indicated at 120 in Packet 3 102. Thus the one frame duration voice data segment 122 lying between the beginning point 118 and the ending point 120 is used to replace the voice data that would have been delivered had lost Packet 4 been received. It may be noted that the replacement data segment begins with data contained in Packet 2 102 and ends with data contained in Packet 3 102.

At 212, the replacement data segment is delivered in place of data from the missing packet.

The method described in connection with FIG. 8 requires minimal computational time and facilities. Moreover, the replacement data selected by the method illustrated in FIG. 8 typically provides a good match for the data in the preceding and following packets 102. For example, in voice data, there is normally a reoccurring pitch period having a pitch pulse that corresponds to the primary vocal chord excitation. That peak 108 is an easily identifiable landmark with which to correlate adjacent pitch periods. The duration 110 from that peak 108 to the end of the frame provides the required offset from the peak to the beginning of the needed replacement data. Thus, by finding a peak and offsetting by that duration, the beginning of a pitch period that will likely match the lost packet data may be found. Because of the repetitiveness of the voice data, it is furthermore likely that the end point 120, one frame after the beginning point 118, will also match the data from the beginning of the packet 102 following the missing packet 102.

If the two packets following the missing packet are available, the replacement data segment may alternately be drawn from the information contained in those packets. Thus, for example, the replacement data segment may begin a duration equal to the offset duration after the peak amplitude of the packet immediately following the missing packet. The replacement data segment may end at an amount equal to the amount of data contained in a packet after the beginning point. That end would typically be found in the packet following the packet immediately following the missing packet. It should be noted that the replacement data segment may be drawn from any received consecutive packets, but best results have been found by utilizing received packets in close proximity to the missing packet.

Because pitch periods are not repeated precisely, the replacement data may be a good match, but there may be some slight discontinuities between the beginning point of the replacement data 118 and the ending data of the previous packet 102 and there may be some slight discontinuities between the end point of the replacement data 120 and the beginning point of the following packet 102. Thus, in an embodiment, fade-in is utilized at the beginning of the replacement data and fade-out is utilized at the end of the replacement data.

Fade-in and fade-out are techniques known to those skilled in the arts of video and audio processing. In fade-in and fade-out, generally, a transitional period is defined in which, for example, a higher amplitude data stream in a preceding packet 102 is attenuated while a lower amplitude data stream in the next packet 102 is increased. In an embodiment, the transition period of 2 ms could be selected. The last 2 ms of data from the packet 102 preceding the lost packet 102 could thus be used to merge with the first 2 ms of replacement data and the last 2 ms of replacement data could be used to merge with the first 2 ms of data from the packet 102 following the lost packet 102.

In an embodiment, a replacement data segment is created by averaging replacement data segments drawn from before and after the missing packet. To do so, a previous replacement data segment is drawn from packets to be delivered before the missing packet and a post replacement data segment is drawn from packets to be delivered after the missing packet. The data in the previous replacement data segment and the post replacement data segment is then averaged and that average is delivered in place of the missing data.

In an embodiment, a replacement data segment may be stored, for example in memory of a general purpose computer, and reused to replace data from more than one missing packet.

In an embodiment of the invention, rather than searching information from a single packet for a maximum amplitude, data from multiple packets may be searched and the maximum for all of those packets may be determined for use in selecting a replacement data segment.

While the system, apparatus, and method of replacing a lost packet has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method of selecting replacement data for a lost packet in a data stream, comprising:
   ascertaining a portion of the data stream contained in each packet;
   determining a peak amplitude of a portion of the data stream included in a first received packet;
   determining a peak amplitude of a portion of the data stream included in a second received packet;
   determining an offset duration from the peak amplitude of the data stream portion included in the first received packet to an end of the data stream portion included in the first received packet; and
   selecting a replacement portion of the data stream beginning an amount equal to the offset duration after the peak amplitude of the second received packet and continuing an amount equal to the portion of the data stream contained in each packet.

2. The method of claim 1, wherein the lost packet is a packet that is received and is replaced.

3. The method of claim 1, wherein the lost packet is a packet that was not received at a receiving entity by a time when data in the lost packet is to be delivered by the receiving entity to a user of the receiving entity.

4. The method of claim 1, wherein the first received packet precedes the lost packet.

5. The method of claim 1, wherein the first received packet immediately precedes the lost packet.

6. The method of claim 1, wherein the first received packet follows the lost packet.

7. The method of claim 1, wherein the second received packet immediately precedes the first received packet.

8. The method of claim 7, wherein the selected portion of the data stream includes data from the second received packet and data from the first received packet.

9. The method of claim 8, further comprising:
   determining a peak amplitude of a portion of the data stream contained within a third received packet;
   selecting a second replacement portion of the data stream beginning an amount equal to the offset duration after the peak amplitude of the third received packet and continuing an amount equal to the portion of the data stream contained in each packet; and
   averaging the replacement portion of the data stream and the second replacement portion of the data stream.

10. The method of claim 9, wherein the third packet is a packet immediately following the lost packet.

11. The method of claim 1, wherein the second received packet immediately follows the lost packet.

12. The method of claim 1, wherein the data stream contains a signal expressed as an amplitude.

13. The method of claim 1, wherein each packet contains a portion of the data stream delivered to a user for a duration of time.

14. The method of claim 1, wherein the data stream includes audio data.

15. The method of claim 1, wherein the data stream includes voice data.

16. The method of claim 1, wherein the data stream includes video data.

17. The method of claim 1, further comprising delivering the replacement portion of the data stream in place of data from the lost packet data.

18. A method of replacing a first frame of a data stream having a plurality of frames, the data stream being expressed as an amplitude, comprising:
   ascertaining a portion of the data stream contained in each frame;
   determining a peak amplitude of a portion of the data stream included in a first received frame;
   determining an offset duration from the peak amplitude of the data stream portion included in the first received frame to an end of the data stream portion included in the first received frame;
   determining a peak amplitude of a portion of the data stream included in a second received frame; and
   replacing the first frame with a portion of the data stream beginning at the peak amplitude of the data stream included in the second received frame and ending an amount equal to the portion of the data stream contained in each packet.

19. The method of claim 18, wherein the replacement portion of the data stream includes data from the second received frame and data from the first received frame.

20. The method of claim 18, wherein the portion of the data stream contained in each frame is delivered to a user for a duration of time.

21. A data stream receiving entity, comprising:
   a computer readable medium containing computer instructions which, when executed by the computer cause the computer to:
   ascertain a portion of the data stream contained in each packet;
   determine a peak amplitude of a portion of the data stream included in a first received packet;
   determine a peak amplitude of a portion of the data stream included in a second received packet;
   determine an offset duration from the peak amplitude of the data stream portion included in the first received packet to an end of the data stream portion included in the first received packet;
   select a replacement portion of the data stream beginning an amount equal to the offset duration after the peak amplitude of the second received packet and continuing an amount equal to the portion of the data stream contained in each packet; and
   deliver the replacement portion in place of the lost packet data.

22. The data stream receiving entity of claim 21, further comprising a speaker attached to the receiving entity through which the data stream is delivered to a user of the receiving entity.

23. The data stream receiving entity of claim 21, a monitor attached to the receiving entity through which the data stream is delivered to a user of the receiving entity.

24. A network comprising:
   a transmitting entity coupled to the network, the transmitting entity transmitting a plurality of packets containing a data stream expressed as an amplitude on the network; and
   a receiving entity coupled to the network, the receiving entity receiving at least two of the plurality of packets transmitted by the transmitting entity and having a processor containing instructions which, when executed by the processor cause the processor to:
   ascertain a portion of the data stream contained in each packet;
   determine a peak amplitude of a portion of the data stream included in a first received packet;
   determine a peak amplitude of a portion of the data stream included in a second received packet;
   determine an offset duration from the peak amplitude of the data stream portion included in the first received packet to an end of the data stream portion included in the first received packet; and select a replacement portion of the data stream beginning an amount equal to the offset duration after the peak amplitude of the second received packet and continuing an amount equal to the portion of the data stream contained in each packet.

25. The network of claim 24, further comprising a speaker attached to the receiving entity through which the data stream is delivered to a user of the receiving entity.

26. The network of claim 24, a further comprising monitor attached to the receiving entity through which the data stream is delivered to a user of the receiving entity.

27. An article of manufacture comprising:
a computer readable medium having stored thereon instructions which, when executed by a computer, cause the computer to:
ascertain a portion of a data stream contained in a packet;
determine a peak amplitude of a portion of the data stream included in a first received packet;
determine a peak amplitude of a portion of the data stream included in a second received packet;
determine an offset duration from the peak amplitude of the data stream portion included in the first received packet to an end of the data stream portion included in the first received packet; and
select a replacement portion of the data stream beginning an amount equal to the offset duration after the peak amplitude of the second received packet and continuing an amount equal to the portion of the data stream contained in each packet.

28. The article of manufacture of claim 27, wherein the data stream includes audio data.

29. The article of manufacture of claim 27, wherein the data stream includes video data.

* * * * *